United States Patent
Kirilov et al.

(10) Patent No.: US 12,314,692 B1
(45) Date of Patent: *May 27, 2025

(54) BI-DIRECTIONAL DESIGN-TO-CODE

(71) Applicant: Progress Software Corporation, Burlington, MA (US)

(72) Inventors: Radoslav Kirilov, Sofia (BG); Daniel Levy, Bedford, MA (US); Ivan Zhekov, Sofia (BG)

(73) Assignee: Progress Software Corporation, Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,445

(22) Filed: Mar. 4, 2024

Related U.S. Application Data

(63) Continuation of application No. 18/172,700, filed on Feb. 22, 2023, now Pat. No. 11,922,142, which is a
(Continued)

(51) Int. Cl.
*G06F 8/70* (2018.01)
*G06F 8/33* (2018.01)
(Continued)

(52) U.S. Cl.
CPC .......... *G06F 8/34* (2013.01); *G06F 8/33* (2013.01); *G06F 16/986* (2019.01); *G06F 8/20* (2013.01); *G06F 8/30* (2013.01); *G06F 8/35* (2013.01); *G06F 8/36* (2013.01); *G06F 8/38* (2013.01); *G06F 8/41* (2013.01); *G06F 8/71* (2013.01);
(Continued)

(58) Field of Classification Search
CPC ..... G06F 8/34; G06F 8/33; G06F 8/20; G06F 8/30; G06F 8/35; G06F 8/36; G06F 8/38; G06F 8/41; G06F 8/71; G06F 16/986; G06F 16/95; G06F 16/958; G06F 16/972; G06F 9/451
See application file for complete search history.

(56) References Cited

U.S. PATENT DOCUMENTS

| 7,047,318 B1 | 5/2006 | Svedloff |
| 7,325,193 B2 | 1/2008 | Edd et al. |

(Continued)

OTHER PUBLICATIONS

Mick Kerrigan et al., The Web Service Modeling Toolkit—An Integrated Development Environment for Semantic Web Services, 2007, [Retrieved on Dec. 9, 2024]. Retrieved from the internet: <URL: https://d1wqtxts1xzle7.cloudfront.net/101798802/10.1007_2F978-3-540-72667-8_57-libre.pdf?> 10 Pages (789-798) (Year: 2007).*

(Continued)

*Primary Examiner* — Anibal Rivera
(74) *Attorney, Agent, or Firm* — Patent Law Works LLP

(57) ABSTRACT

A system and method for bi-directional design to code are disclosed. In one embodiment, the system includes a processor; a memory storing instructions that, when executed, cause the system to obtain, by a plugin, a web application design, the web application design generated using a first design tool; generate, by the plugin, an object model based on the web application design; access, by a configurator, the object model; and generate, by the configurator, for presentation to a developer, the web application design.

20 Claims, 6 Drawing Sheets

Related U.S. Application Data continuation of application No. 17/861,591, filed on Jul. 11, 2022, now Pat. No. 11,645,048, which is a continuation of application No. 16/863,889, filed on Apr. 30, 2020, now Pat. No. 11,385,867.

(60) Provisional application No. 62/843,074, filed on May 3, 2019.

(51) Int. Cl.

| | | |
|---|---|---|
| *G06F 8/34* | (2018.01) | |
| *G06F 8/38* | (2018.01) | |
| *G06F 9/44* | (2018.01) | |
| *G06F 16/23* | (2019.01) | |
| *G06F 16/958* | (2019.01) | |
| G06F 8/20 | (2018.01) | |
| G06F 8/30 | (2018.01) | |
| G06F 8/35 | (2018.01) | |
| G06F 8/36 | (2018.01) | |
| G06F 8/41 | (2018.01) | |
| G06F 8/71 | (2018.01) | |
| G06F 9/451 | (2018.01) | |
| G06F 16/95 | (2019.01) | |

(52) U.S. Cl.
CPC .............. *G06F 9/451* (2018.02); *G06F 16/95* (2019.01); *G06F 16/958* (2019.01); *G06F 16/972* (2019.01)

(56) References Cited

U.S. PATENT DOCUMENTS

| | | | |
|---|---|---|---|
| 10,514,896 B2* | 12/2019 | Varadarajan | .............. G06F 8/34 |
| 10,657,474 B2 | 5/2020 | Moolman et al. | |
| 2002/0184255 A1 | 12/2002 | Edd et al. | |
| 2003/0014442 A1 | 1/2003 | Shiigi et al. | |
| 2003/0192029 A1 | 10/2003 | Hughes | |
| 2007/0150805 A1* | 6/2007 | Misovski | ................. G06F 8/38 |
| | | | 715/234 |
| 2008/0098028 A1 | 4/2008 | Shan et al. | |
| 2009/0228716 A1 | 9/2009 | Poston | |
| 2011/0154295 A1* | 6/2011 | Aharoni | ................ G06F 8/74 |
| | | | 717/125 |
| 2013/0144566 A1 | 6/2013 | De Biswas | |
| 2014/0047413 A1 | 2/2014 | Sheive et al. | |
| 2014/0068545 A1 | 3/2014 | Lehmann | |
| 2014/0173454 A1 | 6/2014 | Sanchez | |
| 2014/0366000 A1 | 12/2014 | Batabyal | |
| 2015/0309770 A1 | 10/2015 | Findlay et al. | |
| 2016/0162263 A1 | 6/2016 | Brunswig | |
| 2017/0322782 A1 | 11/2017 | Pakiman | |
| 2018/0247243 A1 | 8/2018 | Moolman et al. | |
| 2020/0133642 A1 | 4/2020 | Payne | |
| 2020/0134388 A1* | 4/2020 | Rohde | ..................... G06F 40/14 |
| 2020/0160458 A1 | 5/2020 | Bodin | |
| 2020/0348925 A1* | 11/2020 | Ma | ...................... G06F 16/2365 |

OTHER PUBLICATIONS

Cheri Mullins, Responsive, Mobile App, Mobile First: Untangling the UX Design Web in Practical Experience, Jul. 16-17, 2015, [Retrieved on Dec. 5, 2022]. Retrieved from the internet: <URL: https://dl.acm.org/doi/pdf/10.1145/2775441.2775478> 6 Pages {1-6} (Year: 2015).

Jesus Gallardo et al., A model-driven development method for collaborative modeling tools, 2012, [Retrieved on Feb. 2, 2022]. Retrieved from the internet: <URL: https://www.siencedirect.com/science/article/pii/S,1084804511002414> 20 Pages {1086-1105) { Year: 2012).

Adrian Kuhn et al., Embedding Spatial Software Visualization in the IDE: an Exploratory Study, Oct. 25-26, 2010, [Retrieved on Sep. 14, 2023]. Retrieved from the internet: <URL: https://dl.acm.org/doi/pdf/10.1145/1879211.1879229> 10 Pages (113-122) (Year: 2010).

* cited by examiner

BI-DIRECTIONAL DESIGN-TO-CODE

CROSS-REFERENCE TO RELATED APPLICATIONS

The present application is a continuation of U.S. patent application Ser. No. 18/172,700, filed Feb. 22, 2023, titled "Bi-Directional Design-to-Code", now issued as U.S. Pat. No. 11,922,142 on Mar. 5, 2024, which is continuation of U.S. patent application Ser. No. 17/861,591, filed Jul. 11, 2022, titled "Bi-Directional Design-to-Code", now issued as U.S. Pat. No. 11,645,048 filed May 9, 2023, which is a continuation of U.S. patent application Ser. No. 16/863,889, filed Apr. 30, 2020, titled "Bi-Directional Design-to-Code", now issued as U.S. Pat. No. 11,385,867 on Jul. 12, 2022, which claims priority to U.S. Provisional Application No. 62/843,074, filed May 3, 2019, titled "Design-to-Code Team Productivity Accelerating Method," the entirety of which is hereby incorporated by reference.

Applicants hereby notify the USPTO that the claims of the present application are different from those of the parent application and any other related applications. Therefore, Applicants rescind any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application or any other related application.

FIELD OF INVENTION

The present disclosure relates to the creation of user interfaces.

BACKGROUND

Application development often involves Designers, User Experience (UX) Designers, Front End Developers, Developer Architects, which use different tool sets. For example, a designer may use a design tool such as "Sketch" or "Adobe XD." Developers use a development tool to implement a Designer's design.

SUMMARY

In general, an innovative aspect of the subject matter described in this disclosure may be embodied in methods that include obtaining, by a plugin, a web application design, the web application design generated using a first design tool; generating, by the plugin, an object model based on the web application design; accessing, by a configurator, the object model; and generating, by the configurator, for presentation to a developer, the web application design.

According to another innovative aspect of the subject matter described in this disclosure, a system comprises a processor; and a memory storing instructions that, when executed, cause the system to: obtain, by a plugin, a web application design, the web application design generated using a first design tool; generate, by the plugin, an object model based on the web application design; access, by a configurator, the object model; and generate, by the configurator, for presentation to a developer, the web application design.

Other implementations of one or more of these aspects include corresponding systems, apparatus, and computer programs, configured to perform the actions of the methods, encoded on computer storage devices. These and other implementations may each optionally include one or more of the following features.

For instance, receiving, by the configurator, a modification to the web application design made by the developer; and updating, by the configurator, the object model to include the modification. For instance, obtaining, by the plugin, the updated object model; and generating, by the plugin, an updated web application design, the updated web application design presented to via the first design tool. For instance, obtaining the updated object model; and generating an updated web application design, the updated web application design presented to via a second design tool. For instance, the updated web application design presents the modification made by the developer as a suggestion, which a designer can approve or reject. For instance, the updated web application design presents the modification made by the developer as a suggestion, which a designer can approve or reject, when the modification made by the developer is a visual modification.

For instance, generating, based on the object model, a web application. generating the web application includes: selecting a blueprint associated with a framework and including a file with a missing portion, the framework being that of the web application being generated; generating a portion of code from the object model; and inserting the portion of code generated from the object model into the file, the file comprised within the generated web application.

For instance, receiving custom code written by the developer; subsequent to receiving the custom code: updating the object model to include a modification to the web application design; and generating a web application including the custom code. For instance, the object model includes a set of .json files that contain JSON object models describing portions of a web application.

It should be understood that this list of features and advantages is not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Application development often involves Designers, User Experience (UX) Designers, Front End Developers, Developer Architects, which use different tool sets. For example, a designer may use a design tool such as "Sketch" or "Adobe XD." The default output of the design tool varies from tool-to-tool. For example, the design may, by default, be output as an image by one design tool, as a combination of images and snippets of Hypertext Markup Language (HTML), Cascading Style Sheets (CSS), etc. Snippets are then translated into working code by a Developer. Developers use a development tool to implement a Designer's design. However, the Developer may not be able to implement the design for any number of reasons including, but not limited to, varied ideas on how components and applications have to behave and how components should look. The Developer and the Designer then iterate (e.g., the Designer modifies the design using the tool and the Developer attempts to implement modifications in the development tool). However, this iteration is time consuming, increasing the time to market, and may result in a less than ideal user experience. Additionally, there exists no single source of truth within other systems and methods. The system and methods described below may provide a reduction in the number of iterations, a reduction in the amount of duplicated work, a reduction in the time to market, increases the end-user experience, and reduces the time and effort involved in bringing a user-experience to market (e.g. by allowing Designers and Developers to use the tools they are most familiar with when collaborating).

Figure 1:
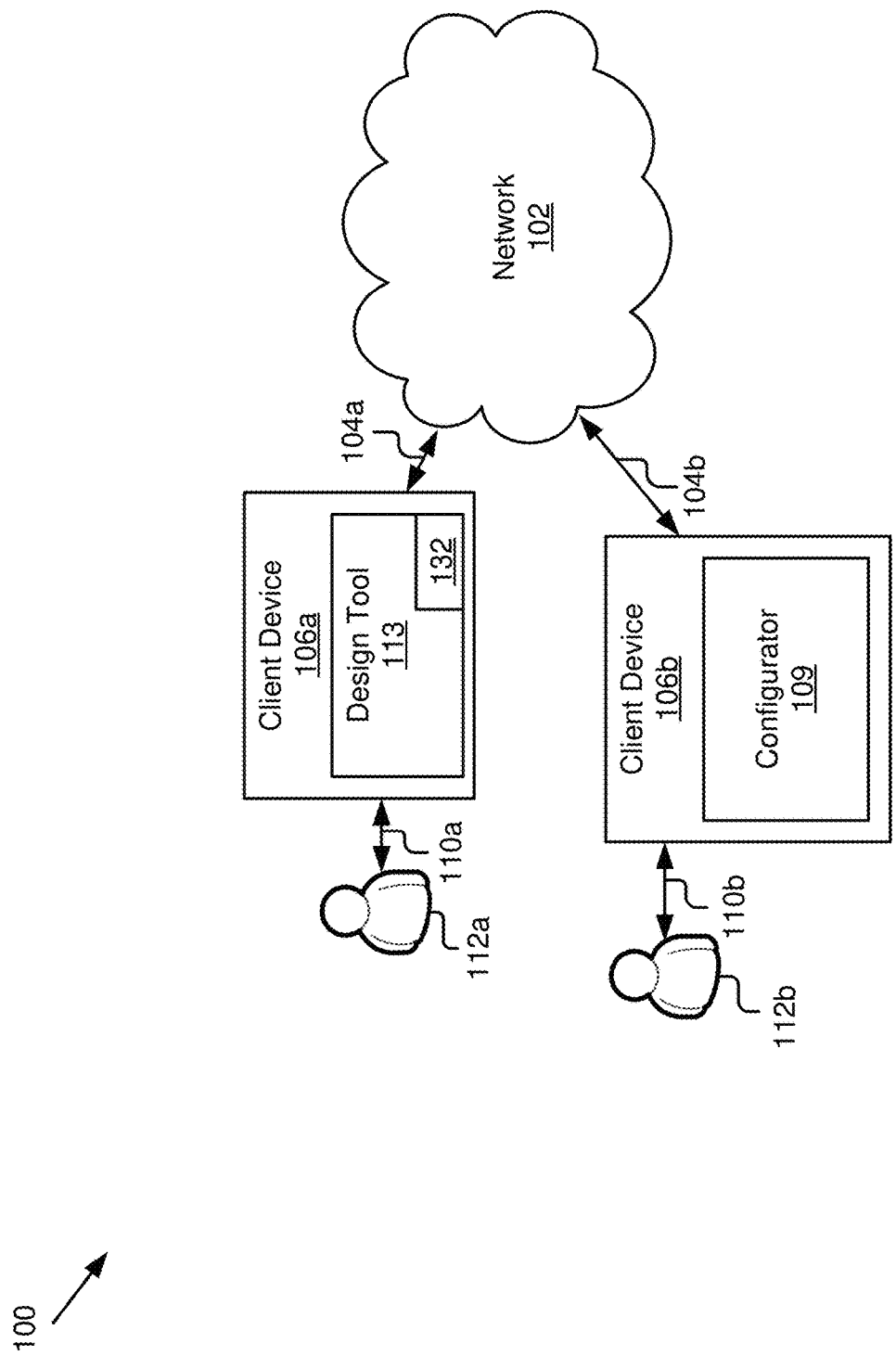
FIG. 1 is a block diagram illustrating an example system for bi-directional design-to-code according to one embodiment.

FIG. 1 is a block diagram illustrating an example system 100 for bi-directional code-to-design according to one embodiment. The illustrated system 100 includes client devices 106a and 106b, which are communicatively coupled via a network 102 for interaction with one another. For example, the client devices 106a and 106b (also referred to and collectively as client devices 106) may be respectively coupled to the network 102 via signal lines 104a and 104b and may be accessed by users 112a and 112b (also referred to individually and collectively as 112) as illustrated by lines 110a and 110b.

For clarity and convenience, the system 100 and examples below, refer to user 112a as a User Experience Designer (or "UX Designer" or "Designer") and user 112b as a Developer. Additionally, for clarity and convenience, FIG. 1 depicts a single Designer 112a with a single client device 106a associated with a single design tool 113, and depicts a single Developer 112b with a single client device 106b associated with a single configurator 109. However, it should be recognized that the description here applies to systems with a different number of Designers 112a, Developers 112b, Designer client devices 106a, Developer client devices 106b, and Configurator 109 in other combinations.

Additionally, in some embodiments, the Designers and Developers need not use the same design tools 113 or configurator 109 as each other. For example, a first designer may use a first design tool (e.g. Sketch), a second designer may use a second design tool (e.g. Adobe XD), a first Developer may use a first configurator (e.g. launched within Visual Studio), and a second Developer may use a second configurator (e.g. the configurator 109 as a separate standalone tool).

In one embodiment, the design tool plugin 132 does not change or modify the inner workings of the design tool 113. In one embodiment, the design tool plugin 132 imports and exports MetaBridge object models and adds additional metadata to the design tool 113 objects. In some such embodiments, the additional metadata is used during the export process of the design tool plugin 132. The design tool plugin 132 may be storable in a memory and executable by a processor of a client device 106a. In some embodiments, the design tool plugin 132 may be specific to the design tool 113, while in other embodiments a single design tool plugin 132 may be compatible with multiple design tools 113.

The configurator 109 opens the MetaBridge object models for presentation to, and modification by, a Developer, and for generating an application based on the MetaBridge object model. The configurator 109 may be storable in a memory and executable by a processor of a client device 106b. In some embodiments, the configurator 109 may be specific to a design tool 113, while in other embodiments a configurator 109 may be compatible with multiple development tools.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the Hypertext Markup Language (HTML), the Extensible Markup language (XML), JavaScript Object Notation (JSON), YAML Ain't Markup Language (YAML), Electronic Data Interchange (EDI) including those in the EDIFACT and X12 families, ACORD/AL3, various National Council for Prescription Drug Programs (NCPDP) standards, Comma Separated Values (CSV), etc. In addition, all or some data can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

It should be noted that while the Designer client device 106a and the Developer client device 106b are illustrated as communicatively coupled via the network 102. It should be recognized that data (e.g. metabridge model described below) may be transferred between the two devices by other means, for example, using a USB Flash Drive or other storage device.

The client devices 106 are computing devices having data processing and communication capabilities. While FIG. 1 illustrates two client devices 106a and 106b, as previously mentioned, the present specification applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a and 106b may couple to and communicate with one another and the other entities of the system 100 via the network 102 using a wireless and/or wired connection. For example, the client devices 106a and 106b are communicatively coupled to store and access the metabridge object model described below.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, as previously mentioned, the system 100 may include any number of client devices 106. In addition, the client devices 106a and 106b may be the same or different types of computing devices. The design tool 113 may be storable in a memory and executable by a processor of a client device 106a. The configurator 109 may be storable in a memory and executable by a processor of a client device 106b.

In some embodiments, the features and functionality of the design tool plugin 132 and/or configurator 109 may be offered as an online service. In one such embodiment, the design tool plugin 132 and/or configurator 109, or portions thereof may reside on a server (not shown). The server may include one or more computing devices having data processing, storing, and communication capabilities. For example, the server may include one or more hardware servers, server arrays, storage devices, systems, etc., and/or may be centralized or distributed/cloud-based. In some implementations, the server may include one or more virtual servers, which operate in a host server environment and access the physical hardware of the host server including, for example, a processor, memory, storage, network interfaces, etc., via an abstraction layer (e.g., a virtual machine manager).

It should be understood that the system 100 illustrated in FIG. 1 is representative of an example system for a bi-directional design-to-code according to one embodiment and that a variety of different system environments and configurations are contemplated and are within the scope of the present disclosure. For instance, various functionality may be moved between devices (e.g. from a server to a client, or vice versa) and some implementations may include additional or fewer computing devices, services, and/or networks, and may implement various functionality client or server-side. Further, various entities of the system 100 may be integrated into a single computing device or system or additional computing devices or systems, etc.

Figure 2:
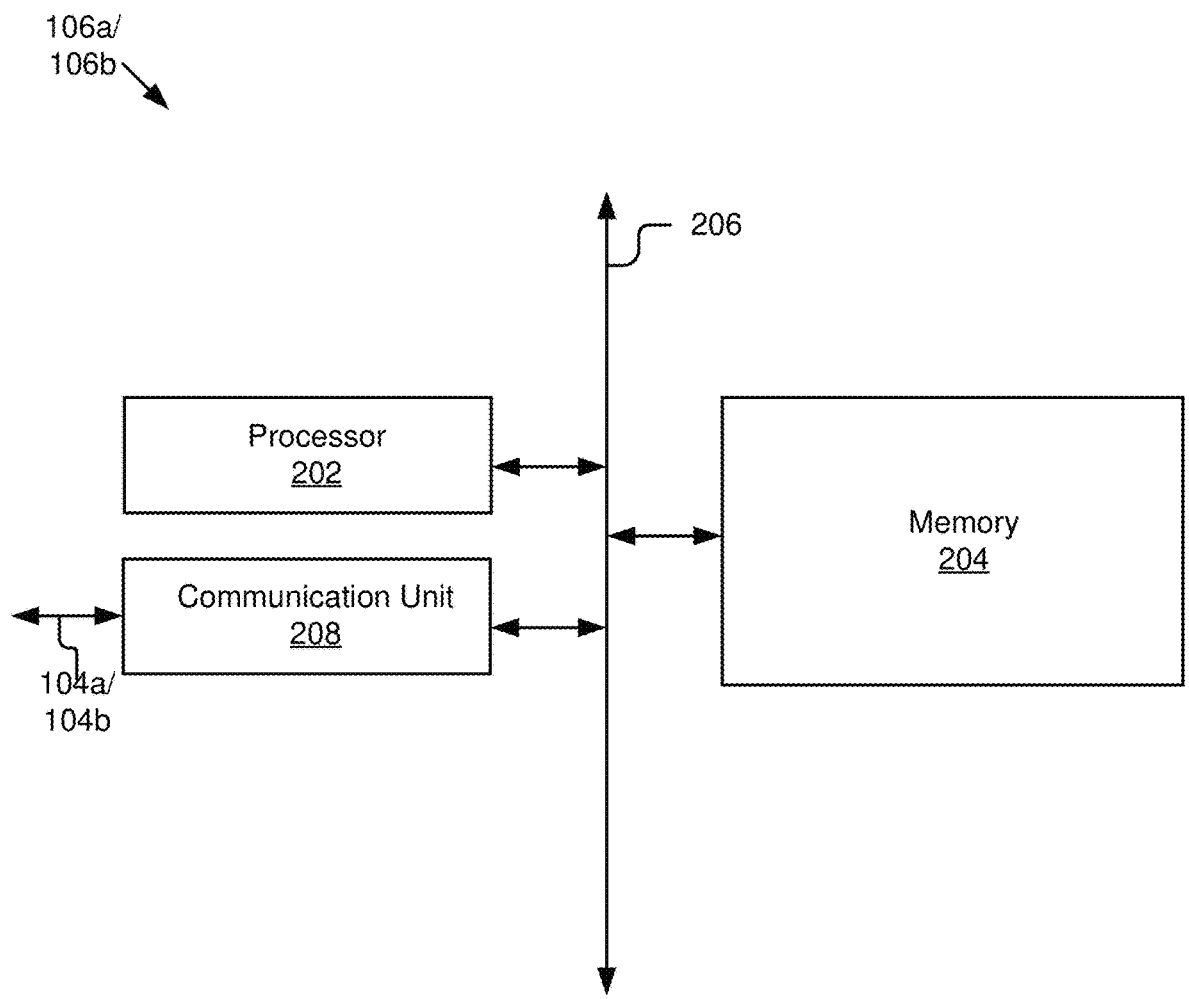
FIG. 2 illustrates an example an example computing device according to one embodiment.

FIG. 2 illustrates an example computing device according to one embodiment. In one embodiment, a computing device, such as a client device 106 or server (not shown), may include a processor 202, a memory 204, and a communication unit 208, which may be communicatively coupled by a bus 206. However, it should be understood that a computing device may take other forms and include additional or fewer components without departing from the scope of the present disclosure. For example, a computing device may include input and output devices (e.g., a display, a keyboard, a mouse, touch screen, speakers, etc.), various operating systems, sensors and other physical configurations.

The processor 202 may execute code, routines and software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory of the computing device via the bus 206 to access data and instructions therefrom and store data therein. The bus 206 may couple the processor 202 to the other components of the computing device including, for example, the memory 204 and communication unit 208.

The memory 204 may store and provide access to data to the other components of the computing device. In some implementations, the memory 204 may store instructions and/or data that may be executed by the processor 202. For example, the computing device may be a Developer's client device 106b and the memory 204 may store the configurator 109. In another example, the computing device may be a Designer's client device 106a and the memory 204 may store the plugin 132 and one or more design tools 113. The memory 204 is also capable of storing other instructions and data, including, for example, an operating system, hardware drivers, other software applications, databases, etc. The memory 204 may be coupled to the bus 206 for communication with the processor 202 and the other components of the computing device. In one embodiment, the memory 204 of the computing device stores the code and routines that, when executed by the computing device's processor 202, perform the functions as described herein. For example, the functionality described below may be performed when code and routines associated with the configurator 109 and design tool plugin 132 and stored in respective memories 204 are executed by their respective processors 202.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory may be a single device or may include multiple types of devices and configurations.

The bus 206 can include a communication bus for transferring data between components of a computing device or between computing devices, a network bus system including the network 102 or portions thereof, a processor mesh, a combination thereof, etc. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network, and radio transceivers for Wi-Fi™ and close-proximity (e.g., Bluetooth®, NFC, etc.) connectivity, etc.; USB interfaces; various combinations thereof; etc. In some implementations, the communication unit 208 can link the processor to the network 102, which may in turn be coupled to other processing systems. The communication unit 208 can provide other connections to the network 102 and to other entities of the system 100 using various standard network communication protocols, including, for example, those discussed elsewhere herein.

As mentioned above, a computing device may include other and/or fewer components. Examples of other components may include a display, an input device, a sensor, etc. (not shown). In one embodiment, the computing device includes a display. The display may display electronic images and data output by the computing device for presentation to a user. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user, etc. For example, the display may be a capacitive touch-screen display capable of detecting and interpreting multiple points of contact with the display surface.

The input device (not shown) may include any device for inputting information into the computing device. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user. For example, the user could interact with an emulated (i.e., virtual or soft) keyboard displayed on the touch-screen display by using fingers to contacting the display in the keyboard regions.

Figure 3:
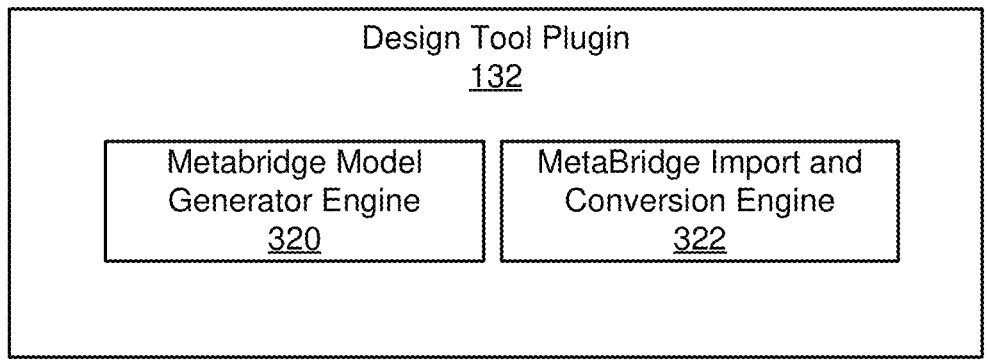
FIG. 3 is a block diagram illustrating an example plugin and example configurator according to one embodiment.
Figure 3:
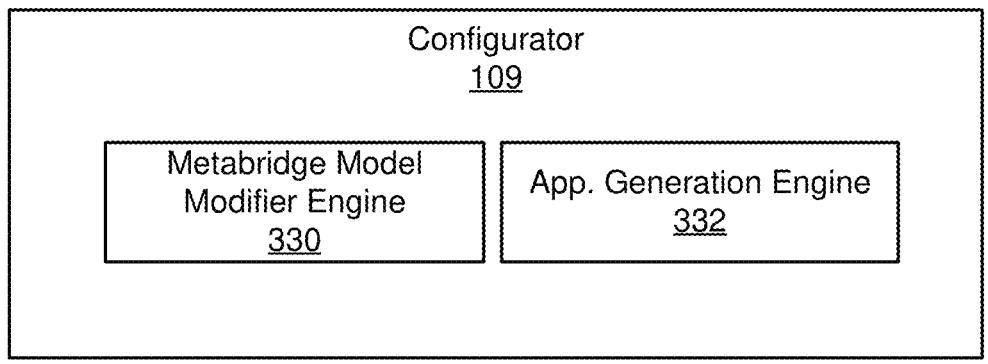

Referring now to FIG. 3, a block diagram illustrating an example design tool plugin 132 and an example configurator 109 are described in more detail according to one embodiment. In one embodiment, the design tool plugin 132 includes a metabridge model generator engine 320 and a metabbridge model import and conversion engine 322. In one embodiment, the configurator engine 109 includes a metabridge model modifier engine 330 and an application generation engine 332.

The components (e.g. 132 and 109), sub-components (e.g., 320, 322, 330, and 332), or subset or combination thereof can be software or routines for providing the features and functionalities described herein. In one embodiment, the engines, sub-engines, or subset thereof are a set of instructions executable by a processor 202. In one embodiment, the engines, sub-engines, or subset thereof are stored in a memory 204 and are accessible and executable by a processor 202. In one embodiment, the engines, sub-engines, or subset thereof are adapted for cooperation and communication with a processor 202 and other components of the computing device including other engines, sub-engines or subset thereof.

The metabridge model generator engine 320 generates one or more models describing an application designed within a design tool 113. The one or more models describing the application are occasionally referred to herein as the "MetaBridge," "metabridge model(s)," or similar.

In one embodiment, the metabridge model generator engine 320 uses an algorithm to map the application designed within a design tool 113 into a metabridge model. In one embodiment, the algorithm is generated from the application programming interface (API) associated with that design tool 113. In one embodiment, the design tool plugin 132 is specific to a particular design tool 113 and the metabridge model generator engine 320 uses a single algorithm or set of algorithms to generate the metabridge model from the application generated within that design tool 113. In one embodiment, the design tool plugin 132 is compatible with multiple design tools 113 and the metabridge model generator engine 320 selects and uses an algorithm or set of algorithms to generate the metabridge model from the application generated within the design tool 113 being used.

In one embodiment, the metabridge model(s) include an object model. in one embodiment, the metabridge model generator engine 320 generates a .json master file along with supporting design files and folders. For example, in one embodiment, the metabridge model generator engine 320 generates a set of .json files which contain Javascript Object Notation (JSON) object models describing the components of the applications. For example, the metabridge model generator engine 320 generates an application object model including, for example, an application name, technology (e.g. Angular or React), a base URL for the application, and application variables (e.g. colors or typography). The application object model may include a modules object model describing one or more modules as subcomponents within the application. The modules object model may includes a views object model, where a view describes a page or other visualization within a module. The views object model may include component models describing components within a view. The application object model may include data providers object model describing data connectivity for the application or a data sources object model describing data sources for the application. These models are used as configuration options for the application generators (e.g. application generation engine 332) to produce different output applications.

In one embodiment, the MetaBridge object models are created using schemas which follow the JSON schema standards. In one embodiment, the schemas are extensible. For example, in one embodiment, the Metabridge model generator engine 320 uses a set of schemas provided by the developer of the design tool plugin 132 (e.g. schemas for applications, modules, views, components, etc.), and an application Designer or Developer with whom they are working may define alternative or additional schemas depend on the Developer needs for a specific object model (e.g. a schema for a particular component). The MetaBridge object models can be represented by a valid JSON object that is created from a valid JSON schema. For example, if a Developer desires a model for an X component with a Y property which is populated with a default Z value, the Developer may, in one embodiment, create a X .json JSON schema file with the following content:

```
{
  "$schema": "http://json-schema.org/schema #",
  "id": "X",
  "name": "X",
  "type": "object",
  "description": "X component",
  "properties": {
    "Y": {
      "type": "string",
      "title": "Y property",
      "description": "Y Property description",
      "default": "Z"
    },
  }
}
```

As a result, based on the schema in the X.json file, the logic behind the design tool plugin 132 or the configurator 109 creates the following model in the MetaBridge:

```
{
  Y:"Z"
}
```

The metabridge model generator engine 320 generates, or modifies generated, metabridge model(s) associated with the web application designed within a design tool 113. In one embodiment, the metabridge import and conversion engine 322 does the reverse-importing and generating the web application design within the design tool 113 based on associated metabridge model(s).

The metabridge model(s) (e.g. JSON schemas) are used by the design tool plugin 132 and the configurator 109 for building appropriate editors for any property of the specific model. For example, in the above use case, a text box for changing the value of the Y property is rendered (not shown). When the developer makes changes to a property in the configurator 109 or if the designer exports design changes, the models are saved on the file system as MetaBridge object models.

In some embodiments, the JSON schema descriptions for object models may be universal and the same across multiple design tools and multiple target applications. Thus, the MetaBridge object models that are created based on the schemas are universal and describe universal object models which can be used in supported design tools 113 and application generator engine 332. Therefore, in some embodiments, a MetaBridge model is not coupled with any particular technology, so developers can choose different frameworks as a target output for the generated application. In some embodiments, the schema will differ for each output framework.

In some embodiments, a Designer provides the design tool plugin 132 with layout preference information associated with elements within the design generated within the design tool 113. For example, the Designer identifies content as one or more of "horizontal," "vertical," and "content" in order to more accurately translate the design into code (e.g. HTML or CSS) when the application is generated.

In one embodiment, the configurator 109 is an on-premise multiplatform application which is used by developers for configuring the MetaBridge object models. In one embodiment, each object model from MetaBridge has a visual representation in the Configurator 109. When the Developer imports a MetaBridge application in the configurator 109, the configurator 109 loads the object models and visually renders them. In one embodiment, the Developer can then change the values of the model properties by using the editors of the configurator 109. In one embodiment, the edits are implemented in the metabridge model(s) by the metabridge model modifier engine 330, which may modify or re-generate the metabridge model(s). In one embodiment, these editors are created based on the property description from the schema of the object model. For example, when the property description in the schema has a numeric type (e.g. int, float, etc.) the editor created includes a numeric keypad, and when the property description has an alphanumeric type (e.g. a string) the editor created includes a QWERTY keyboard.

The application generation engine 332 reads from the MetaBridge and generates front-end code. In one embodiment, guidance provided on where business logic code can be inserted so that re-generation does not over-write it. In one embodiment, guidance is provided on how to update HTML/CSS in a manner that will not be overwritten. In some embodiments, the custom code does NOT pass back to the MetaBridge. The MetaBridge can continue to be updated in a manner that does not overwrite code changes that were made using the guidance.

In one embodiment, the application generator engine 332, occasionally referred to as application generator, contains blueprints for generating the files of a specific technology application. Based on the MetaBridge object models, when the generation process is executed, various parts of the blueprint or various blueprints are used to generate the application. For example, the application generator engine 332 uses a first blueprint to generate an application that uses the Angular framework and uses a second blueprint to generate a second application that uses the React framework. Depending on the framework, the files generated may vary and include, for example, one or more of type script, HTML, CSS, SAS, configuration files, React, JSON, etc. files. In one embodiment, the blueprints are extensible to support additional (e.g. yet to be developed) frameworks.

In one embodiment, the blueprints include a set of files associated with the selected framework of the output application, and those files include one or more blank sections that are populated by the application generator engine 332 based on the metabridge object modules to generate a set of files for the application under design. For example, assume the application generated is to use the Angular framework, and assume that an Angular application includes an HTML file; in one embodiment, an angular blueprint includes an HTML file with portions missing. In some embodiments, the missing portions may be tagged or include a placeholder to identify where missing portions exist to be populated. In the above example, the application generator engine 332 generates an HTML document by adding tags (e.g. <body> and </body>), defining attributes (e.g. <body style="background-image.url (image.jpg)">), etc. based on the metabridge object model to generate an HTML document for the Angular application. It should be understood that HTML is used herein as an example, and that the application generator engine 332 and the description herein are not limited to HTML files, or Angular and React as frameworks. Rather, these are used as examples for clarity, and the description herein applies to other and different frameworks and types of files and not limited to those listed herein.

When the MetaBridge object models are changed, the application generator engine 332 may be executed to generate files implementing the change, and a different application is produced as an output from the generation process.

Design-to-Code

In some embodiments, the generated application code is updated when a UX Designer makes any of the following changes:

Adds a new visualization.

Changes a particular layout within a visualization.

Replaces a specific component in the visualization with a different one.

Makes other design-specific updates.

For example, the design tool plugin 132 automatically updates the metabridge model(s) and the configurator 109 automatically (re) generates the code for the web application. In an alternative example, the design tool plugin 132 updates the metabridge model(s) when a Designer re-exports the design, and the configurator 109 automatically (re) generates the code for the web application subsequent to the re-export.

Code-to-Design

In some embodiments, the design is updated when a Developer makes any of the following changes:

Changes a component property which results in a change in the visual representation of the component.

Changes a view layout.

Replaces one component with another.

For example, the configurator 109 automatically updates the metabridge model(s) based on the Developer's change and the design tool plugin 132 imports the updated metabridge model(s) into the design tool 113 and renders the modified design within the design tool 113 for review by the Designer.

In some embodiments, changes made by the Developer are presented as suggestions, in the design tool 113, to the Designer and the Designer may choose to accept or reject the suggestions. In some embodiments, when a Developer's change is rejected, the Designer may implement an alternative change in the design tool 113, which would then be exported to the metabridge model and opened within the configurator 109 and viewable by the Developer.

In some embodiments, changes by the Developer that change the visual characteristics of the application are presented as a suggestion to the Designer for approval, but changes that do not have a visual queue are not subject to review or approval by a Designer. For example, if the Developer implemented column filterable that may be suggested to a Designer, as a filterable column is visually distinct from a non-filterable column, but when the Developer makes a column resizable or sortable by an application end-user that may not be suggested to the Designer.

Depending on the embodiment, various versioning and audit mechanisms may be used, for example, to roll back the metabridge model to the prior version when a Designer rejects a Developer's suggested change.

Prior workflows fail to synchronize changes that are made in the design with changes that are made in the developed application, and vice versa. The bi-directional synchronization described herein bridges the gaps in the collaborative process between UX designers and software developers. Having a single source of truth which is in sync with the design and the developed application enables organizations to deliver consistency across diverse sets of applications, which may provide value to one or more of UX Designers, Developers, and Directors of Development. For example, UX Designers may experience one or more of faster design creation with component libraries, pixel-perfect implementation of the design, and better collaboration with Developers. Developers may experience one or more of easy replication of any complex UIs provided by designers, greater quality and unification of code styles for Developers who work on the same project, greater productivity as developers can use auto-generated UIs and logic for common screens, and better collaboration with Designers. Directors of Development may experience one or more of increased performance of and across teams—with the MetaBridge, the design of an application can be transferred to code and vice versa, and increased cross-functional culture-developers will work with UX designers more efficiently and vice versa.

Example Methods

Figure 4:
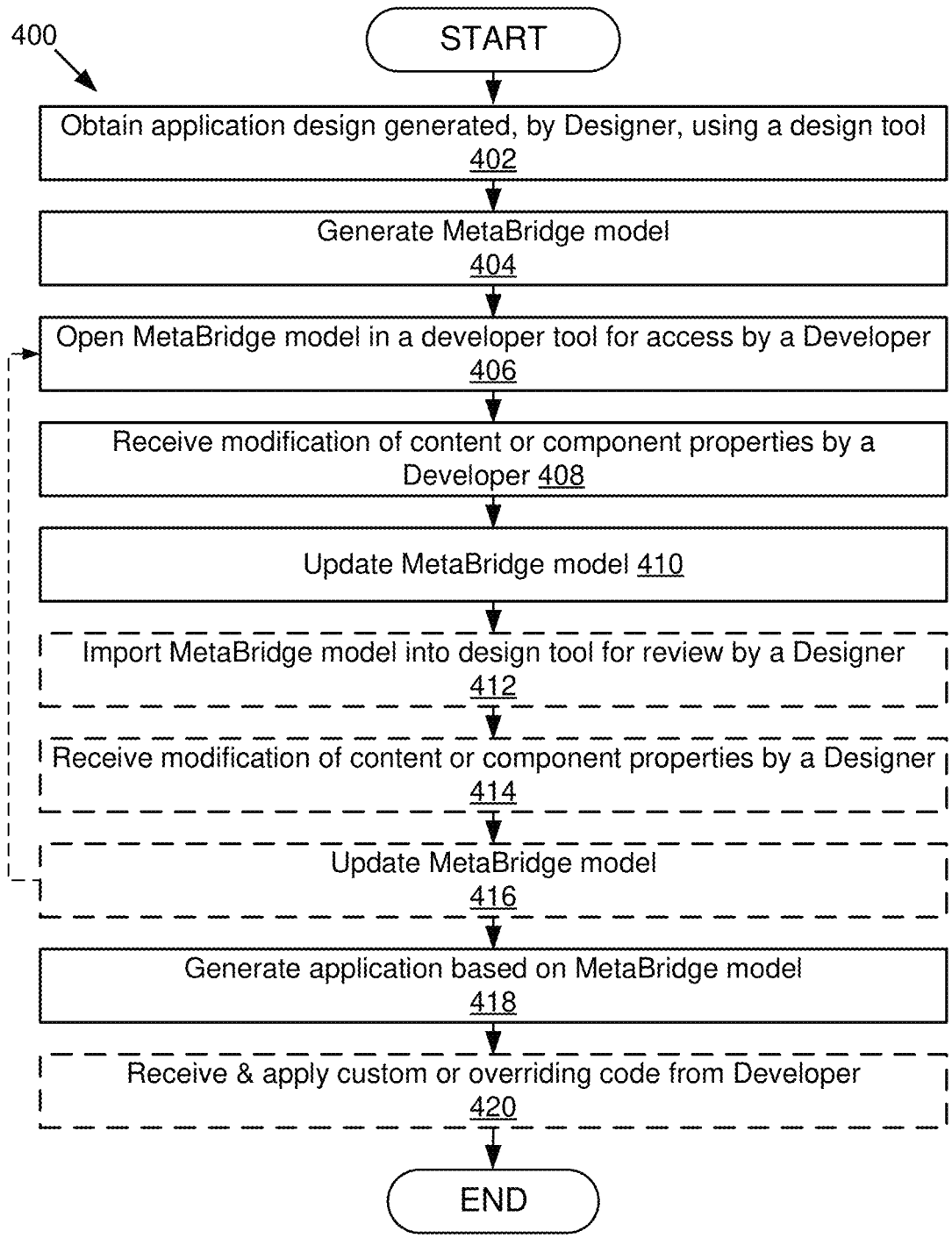
FIG. 4 is a flowchart of an example method for bi-directional design-to-code according to one embodiment.
Figure 5:
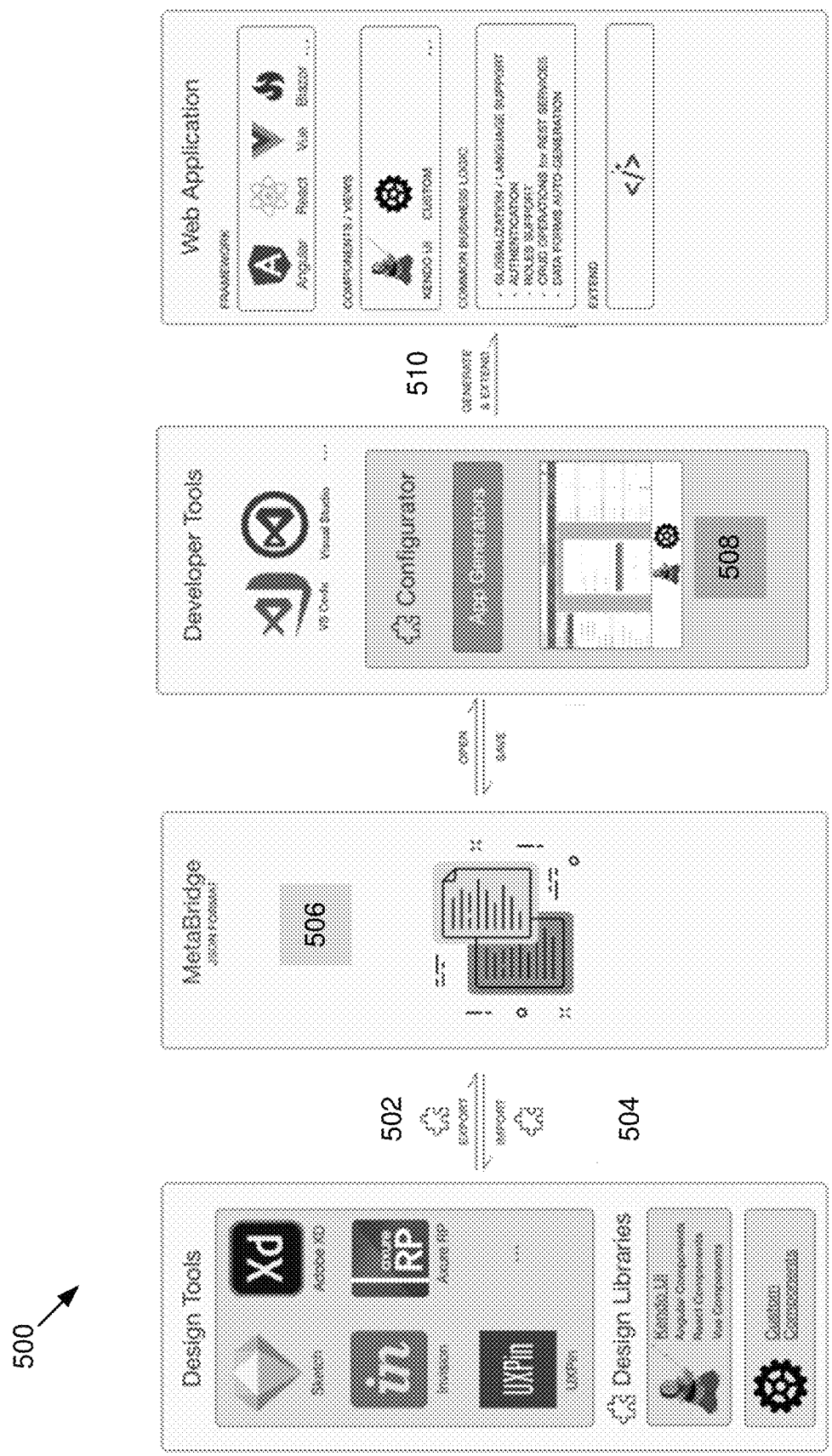
FIG. 5 is diagram of an example workflow for bi-directional design-to-code according to one embodiment.
Figure 6:
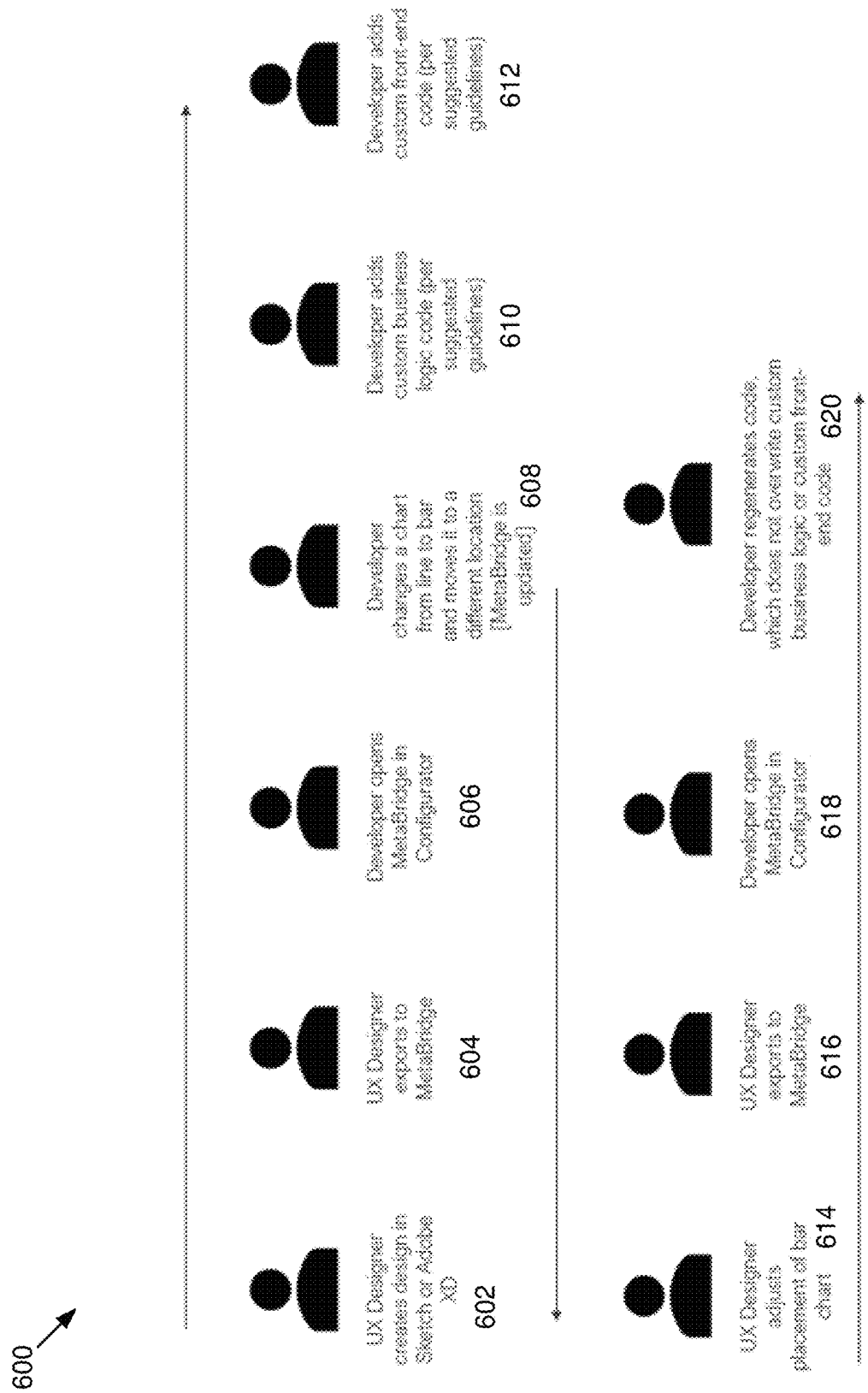
FIG. 6 is diagram of a more detailed example of a portion of the workflow for bi-directional design-to-code according to one embodiment.

FIGS. 4, 5 and 6 depict example methods 400 and work flows 500 performed by the system described above in reference to FIGS. 1-3 according to some embodiments. However, it should be recognized that the methods described herein are merely examples and that other examples and embodiments exist. For example, example embodiments which have more, fewer, or different components and/or reorder a portion of the components of 400, 500, or 600.

Referring to FIG. 4 an example method 400 for a bi-direction design-to-code according to one embodiment is shown. In the illustrated example embodiment, at 402, the metabridge model generator engine 320 of the design tool plugin 132 obtains the application design generated by the Designer using a design tool, and, at 404, generates a metabridge model based on that application design. At 406, the configurator opens the metabridge model in a developer tool for presentation to a Developer, who subsequently modifies the content or a component property of the application under development (e.g. by removing, rearranging, or adding components). At 410, the metabridge model modifier engine 330 updates the metabridge model to capture the modification by the Developer received at 408.

At 412, the Designer may optionally import the updated metabridge model into the design tool, using the metabridge import and conversion engine 322, and review the modification(s) made by the Developer. The Designer may optionally further modify the content or component properties, which are received at 414, and the metabridge model is updated, by the metabridge model generator engine 320 at 416, to capture those changes made by the Designer. Steps 406-416 may optionally be repeated until the Designer and Developer are satisfied with the application under development or have no further modifications.

At 418, the application generation engine 332 generates an application based on the metabridge model. At 420, the Developer may optionally add custom code or override the code generated at 418 (e.g. using an Integrated Development Environment of their choice), and the method 400 ends.

Referring to FIG. 5, an example workflow 500 for bi-directional design-to-code according to one embodiment is shown. FIG. 5 depicts various example design tools 113 including Sketch, Adobe XD, Invision, Axure RP, UXPin. In one embodiment, the design tool plugin 132 allows a Designer to use the design tool 113 of his or her choice. In one embodiment, the design tool plugin 132 also supports one or more design libraries (e.g. Kendo UI, which includes Angular, React and Vue Components, as illustrated) and/or one or more custom components. The Designer may map custom components (e.g. visual components made by the Designer) to a corresponding custom component made by a Developer via the plugin's 132 custom components section. In some embodiments, the design tool plugin 132 includes a visual editor for designer related properties thereby allowing a Designer to change designer related properties via the visual editors. The changes are then stored in the metabridge model and transferred to the generated application during generation by the application generation engine 332.

At 502, the Design is exported using the design tool plugin 132 to the metabridge model. Alternatively, at 504, an existing metabridge model (e.g. one previously created by a Designer and, optionally, modified by a Developer) may be imported into the design tool 113 using the design tool plugin 132.

At 506, a metabridge model, which are generated and stored by the design tool plugin 132 and may be subsequently modified by the configurator 109, is represented.

At 508, the configurator 109 opens the metabridge model. The metabridge may be updated by the metabridge model modifier engine 330 as changes are made or saved by the Developer.

At 510, the application generator engine 332 of the configurator 109 generates a web application. FIG. 5 illustrates a variety of example frameworks, which the configurator 109 may use in generating the web application. Depending on the embodiment, the configurator 109 may support one or more web application frameworks. For example, in one embodiment, the configurator 109 may generate a web application using the Angular framework. In another example, the configurator 109 may also, or only (depending on the embodiment), generate a web application using the React framework.

In one embodiment, the configurator 109 renders any libraries or custom components used by the design tool 113 as components, or views, within the generated web application.

In one embodiment, the generated web application includes business logic. In one embodiment, the business logic is extendable. For example, a developer may write code to add or modify the behavior of the web application. In one embodiment, the extendable business logic includes portions that are editable and persistent. Note that while the business logic may be edited, in one embodiment, only edits within the editable and persistent portions will remain when the configurator 109 regenerates the web application. For example, assume that the configurator 109 generates business logic with areas designated as editable and persistent and the Developer writes some extension code (e.g. custom business logic) in that section. Also assume that the web application needs to be regenerated, for example, because the Designer or Developer made modifications. In one embodiment, the configurator 109 (re)generates the web application thereby implementing the modifications, but the extension code in the area(s) designated as editable and persistent in the previous version of the web application are copied over or not overwritten (depending on the embodiment). In some embodiments, extensions or modifications outside the area(s) designated as editable and persistent are lost during such a (re) generation. In some embodiments, the configurator 109 identifies the area(s) designated as editable and persistent using one or more of a comment and a tag within the web application code generated by the configurator 109 or by additional documentation (e.g. training videos, manuals, etc.). The tags, comments, videos, training documentation, etc. are occasionally referred to herein as "guidelines," "suggested guidelines" or similar.

Referring to FIG. 6, an example workflow 600 is illustrated according to one embodiment. At 602, a Designer creates an application design (e.g. using in Sketch or Adobe XD as a design tool 113). At 604, the Designer exports the design and stores it as a MetaBridge model. At 606, a Developer opens the MetaBridge model using the configurator 109. At 608, the Developer modifies the design (e.g. changes a chart from line to bar and moves it to a different location) and the MetaBridge model is updated. At 610, the Developer adds custom business logic code per suggested guidelines, and, at 612, adds custom front-end code per suggested guidelines. At 614, the Designer, having imported the MetaBridge model back into the design tool 113 using the design tool plugin 132, modifies the design (e.g. changes the placement of the bar chart), and, at 616, the design tool plugin 132 exports the MetaBridge Model. At 618, the Developer opens the MetaBridge model using the configurator 109, and, at 620, the application generation engine 332 generates code, which does not overwrite the custom business logic added at 610 or the custom front-end code added at 612, and method 600 ends.

Other Considerations

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment," "an embodiment," "one implementation" or "an implementation" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMS, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, engines, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure not limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
    obtaining, using one or more processors, an object model associated with a web application design, wherein the web application design was initially designed using a first designer-selected design tool, and wherein the object model is integrated development environment and design tool agnostic;
    updating, using the one or more processors, the object model based on a modification to the web application design made via one or more of a developer-selected, integrated development environment and a second designer-selected design tool; and
    presenting, based on the updated object model, an updated web application design using one or more of:
        the first designer-selected design tool,
        the second designer-selected design tool when the modification is made via the developer-selected, integrated development environment, and
        the developer-selected, integrated development environment when the modification is made via the second designer-selected design tool.

2. The method of claim 1, comprising:
    generating the object model based on the initial web application design.

3. The method of claim 1, comprising:
    receiving the modification to the web application design made using one or more of the developer-selected, integrated development environment and the second designer-selected design tool.

4. The method of claim 1, wherein the first designer-selected design tool is selected from a group consisting of Sketch™, Adobe XD™, Invision™, Axure™, and UXPin™, and wherein the second designer-selected design tool is a different design tool than the first designer-selected design tool.

5. The method of claim 1, wherein the updated web application design presents the modification made using one or more of the developer-selected, integrated development environment and the second designer-selected design tool as a suggestion, which a first designer can approve or reject.

6. The method of claim 1, wherein the updated web application design presents the modification made using one or more of the developer-selected, integrated development environment and the second designer-selected design tool as a suggestion, which a first designer can approve or reject, when the modification made is a visual modification.

7. The method of claim 1, comprising:
generating, based on the updated object model, a web application.

8. The method of claim 7, wherein generating the web application includes:
generating a portion of code from the updated object model; and
inserting the portion of code generated from the updated object model into code associated with the generated web application.

9. The method of claim 1, comprising:
receiving custom code written by a developer; and
subsequent to receiving the custom code:
updating the object model to include the modification to the web application design; and
generating a web application including the custom code.

10. The method of claim 1, wherein the object model includes a set of .json files that contain Java Script Object Notation object models describing portions of a web application.

11. A system comprising:
a processor;
a memory storing instructions that, when executed, cause the system to
obtain an object model associated with a web application design, wherein the web application design was initially designed using a first designer-selected design tool, and wherein the object model is integrated development environment and design tool agnostic;
update the object model based on a modification to the web application design made via one or more of a developer-selected, integrated development environment and a second designer-selected design tool; and
present, based on the updated object model, an updated web application design using one or more of:
the first designer-selected design tool,
the second designer-selected design tool when the modification is made via the developer-selected, integrated development environment, and
the developer-selected, integrated development environment when the modification is made via the second designer-selected design tool.

12. The system of claim 11, the memory further storing instructions that, when executed cause the system to:
generate the object model based on the initial web application design.

13. The system of claim 11, the memory further storing instructions that, when executed cause the system to:
receive the modification to the web application design made using one or more of the developer-selected, integrated development environment and the second designer-selected design tool.

14. The system of claim 11, wherein the first designer-selected design tool is selected from a group consisting of Sketch™, Adobe XD™, Invision™, Axure™, and UXPin™, and wherein the second designer-selected design tool is a different design tool than the first designer-selected design tool.

15. The system of claim 11, wherein the updated web application design presents the modification made using one or more of the developer-selected, integrated development environment and the second designer-selected design tool as a suggestion, which a first designer can approve or reject.

16. The system of claim 11, wherein the updated web application design presents the modification made using one or more of the developer-selected, integrated development environment and the second designer-selected design tool as a suggestion, which a first designer can approve or reject, when the modification made is a visual modification.

17. The system of claim 11, the memory further storing instructions that, when executed cause the system to:
generating, based on the updated object model, a web application.

18. The system of claim 17, wherein generating the web application includes:
generating a portion of code from the updated object model; and
inserting the portion of code generated from the updated object model into code associated with the web application.

19. The system of claim 11, the memory further storing instructions that, when executed cause the system to:
receive custom code written by a developer; and
subsequent to receiving the custom code:
updating the object model to include the modification to the web application design; and
generating a web application including the custom code.

20. The system of claim 11, wherein the object model includes a set of .json files that contain Javascript Object Notation object models describing portions of a web application.

* * * * *